(12) United States Patent
Castillo et al.

(10) Patent No.: US 12,394,530 B2
(45) Date of Patent: Aug. 19, 2025

(54) OFFSHORE ENERGY GENERATION SYSTEM (OEGS)

(71) Applicants: Javier Ricardo Castillo, Katy, TX (US); Leonardo Do Valle Fehlberg, Rio de Janeiro (BR)

(72) Inventors: Javier Ricardo Castillo, Katy, TX (US); Leonardo Do Valle Fehlberg, Rio de Janeiro (BR)

( * ) Notice: Subject to any disclaimer, the term of this patent is extended or adjusted under 35 U.S.C. 154(b) by 187 days.

(21) Appl. No.: 17/162,149

(22) Filed: Jan. 29, 2021

(65) Prior Publication Data

US 2022/0246318 A1     Aug. 4, 2022

(51) Int. Cl.
*B63B 35/44*     (2006.01)
*G21C 9/04*     (2006.01)
*G21D 1/00*     (2006.01)

(52) U.S. Cl.
CPC ............... *G21C 9/04* (2013.01); *G21D 1/00* (2013.01); *B63B 2035/4433* (2013.01)

(58) Field of Classification Search
CPC .... B63B 2035/4433; B63B 2035/4446; B63B 2035/448
See application file for complete search history.

(56) References Cited

U.S. PATENT DOCUMENTS

| 4,302,291 A | 11/1981 | Severs et al. |
| 7,331,303 B2 | 2/2008 | Park |
| 9,443,620 B2 | 9/2016 | Sato et al. |
| 10,269,462 B2 | 4/2019 | Richardson |
| 2011/0158370 A1* | 6/2011 | Morgan ................. B63B 1/107 405/195.1 |

(Continued)

FOREIGN PATENT DOCUMENTS

| AU | 2014100635 A4 * | 7/2014 |
| AU | 2014101274 A4 | 11/2014 |

(Continued)

OTHER PUBLICATIONS

Al-Othman, Amani, et al. "Nuclear desalination: A state-of-the-art review." Desalination 457 (2019): p. 45. (Year: 2019).*

(Continued)

*Primary Examiner* — Lily C Garner
(74) *Attorney, Agent, or Firm* — RC Trademark Compay

(57) ABSTRACT

An offshore energy generation system (OEGS), is described. The offshore energy generation system delivers clean energy in the form of electricity and/or ammonia (NH3) and freshwater to offshore or onshore consumers. By deploying this offshore energy generation system, the net zero emissions targets from IPCC can be achieved and the water scarcity crisis mitigated. The offshore energy generation system enables better safety of the population served, optimal use of land, eliminate land use conflicts and enables the protection of the world cultural heritage. The offshore energy generation system comprises of an electric power generation system based on nuclear or hydrogen (H2) fuel cells, ammonia generation, freshwater generation, offshore cranes, data processing centers, blockchain, helideck, telecommunications system, automation and control system, nitrogen and hydrogen generation systems.

6 Claims, 5 Drawing Sheets

(56) References Cited

U.S. PATENT DOCUMENTS

| | | | |
|---|---|---|---|
| 2014/0140466 A1 | 5/2014 | Richardson | |
| 2021/0098143 A1* | 4/2021 | Trojer | ................ G21C 5/10 |
| 2022/0246318 A1 | 8/2022 | Castillo et al. | |
| 2024/0025517 A1* | 1/2024 | Do Valle Fehlberg | .. G21D 1/00 |

FOREIGN PATENT DOCUMENTS

| | | | | |
|---|---|---|---|---|
| CN | 204066759 U | | 12/2014 | |
| CN | 104264646 A | | 1/2015 | |
| CN | 204252096 U | | 4/2015 | |
| CN | 104960637 A | | 10/2015 | |
| CN | 105059489 A | | 11/2015 | |
| CN | 105501404 A | | 4/2016 | |
| CN | 109524141 A | * | 3/2019 | ............ C02F 1/441 |
| CN | 216215922 U | | 4/2022 | |
| KR | 20150115233 A | * | 10/2015 | |
| KR | 101695881 B1 | * | 1/2017 | |
| KR | 20210105852 A | | 8/2021 | |
| KR | 20210105854 A | | 8/2021 | |
| KR | 20230149069 A | * | 10/2023 | |
| KR | 20240008571 A | * | 1/2024 | |
| WO | 2010096735 A1 | | 8/2010 | |
| WO | 2015147952 A3 | | 11/2015 | |
| WO | 2019204857 A1 | | 10/2019 | |

OTHER PUBLICATIONS

IDE Technologies. MED—How it works. Brochure. Accessed Jan. 16, 2025. <https://www.ide-tech.com/wp-content/uploads/2022/12/Multi-Effect-Distillation-MED-Brochure.pdf>. (Year: 2022).*
Extended European Search Report issued for European Patent Application EP24159775.6, on Sep. 27, 2024, 08 Pages.

* cited by examiner

OFFSHORE ENERGY GENERATION SYSTEM (OEGS)

TECHNICAL FIELD

The present disclosure relates to offshore energy generation systems.

BACKGROUND OF THE INVENTION

Considering that the intergovernmental panel on climate change (IPCC), from the United Nations, is calling for a net zero challenge, that require a step change in technology innovation in critical areas such as making low-carbon electricity the main source for manufacturing, heating buildings and powering vehicles, capturing, storing and utilizing carbon dioxide before it escapes into the atmosphere, realizing the potential of clean hydrogen across many industries, and massively expanding the use of sustainable bioenergy.

Considering that to accomplish this challenge it will be necessary to increase our worldwide energy supply to about 50% more than that was being produced in 2018; and at the same time execute a major decarbonization of entire economies worldwide to reduce the carbon emission to the atmosphere to levels that ensure a secure environment. This will require the rapid development of many technologies that are still in their very early stages today-some of them are barely out of the laboratory. Recent IEA (International Energy Agency) analysis has assessed the market readiness of 400 different technologies that will be needed but finds that only about half of the additional emissions savings needed to reach net-zero emissions by 2050 are available to the market today.

Considering the urgency of this call to action the authors performed a very detailed and systematic analysis; of all the current technologies available for power generation and storage; utilising their extensive project management, engineering experience and business mindset as the foundation; as well as market analysis from the customer perspective to provide a best-in-class solution to address the climate challenge.

At the time of submittal of this document, about 13% (940 million) of the world population does not have access to electricity, about 11% (840 million) of the world population does not have access to drinking water, and about 40% (3 billion) of the world population does not have access to clean fuels for cooking. This comes at a high health cost for indoor air pollution. Based on current forecasts about 25% of the world population will likely live in a country affected by chronic or recurring freshwater shortages.

The total area of the World Ocean is about 361.9 million square kilometers (139.7 million square miles), which covers about 70.9% of Earth's surface and there are about 620,000 kilometers (372,000 miles) of coastline in the only planet we have. Over one-third of the total human population, nearly 2.4 billion people, lives within 100 km (60 miles) of an oceanic coast.

Chinese patent CN105059489A describes a constantly stable offshore nuclear power platform, that is limited to the generation of electricity and water desalinization; and it is not characterized to produce zero carbon emissions. The claims on the patent CN105059489A are mainly centered in hull components.

Chinese patents CN104960637A (Offshore nuclear power platform for shallow ice sea regions) and CN104960637B (A type of marine nuclear power platform for shallow water ice formation marine site) relates to an offshore nuclear power platform for shallow ice sea regions.

U.S. Pat. No. 9,443,620B2 (Reactor containment vessel and nuclear power plant using the same) is related and limited to the specific design of a nuclear reactor.

The Chinese patents CN105501404A (Oversea floating type nuclear power generating device of polygonal structure), CN104264646A (Concrete marine nuclear power platform) and CN204252096U (The marine nuclear power platform of a type of concrete) are related to specific geometry like the polygonal structure defined in the CN105501404A or the concrete materials used on the CN104264646A and CN204252096U.

The International patent WO2015147952A3 (Floating nuclear power reactor with a self-cooling containment structure and an emergency heat exchange system) and the U.S. Pat. No. 7,331,303B2 (Floating power plant) claim a specific type of nuclear reactor meanwhile. The WO2015147952A3 floating nuclear power reactor includes a self-cooling containment structure and an emergency heat exchange system.

The Chinese patent CN204066759U (A type of nuclear power station of removable marine nuclear power platform) describes a specific nuclear platform design that has a removable caisson.

The U.S. Pat. No. 10,269,462B2 (Semi-submersible nuclear power plant and multi-purpose platform) scope includes a nuclear power plant that is integrated into the submerged hull of an offshore, floating spar or cell spar platform. Furthermore, the patent U.S. Pat. No. 10,269,462B2 is also limited to generating electricity and ancillary services for its own use like desalinated water.

The International Patent WO2010/096735A1 (Offshore energy carrier production plant) and the US patent US20140140466A1 (Semi Submersible Nuclear Power Plant and Multipurpose Platform) for the offshore energy carrier is a nuclear fission plant intended to produce and dispatch energy carriers from hydrogen to hydrocarbons such as methanol and jet fuel.

The U.S. Pat. No. 4,302,291A (Underwater nuclear power plant structure) comprises a triangular platform formed of tubular leg and truss members upon which are attached one or more large spherical pressure vessels.

There have been multiple floating nuclear facilities constructed since the 1960's when the US Army commissioned the Sturgis as the first floating nuclear power plant. But none of these facilities have the unique characteristics to meet the currently desired environmental benefits, such as zero carbon emissions, clean freshwater and ammonia as energy carrier for the hydrogen.

Therefore, in light of the foregoing discussion, there exists a need to overcome the aforementioned drawbacks.

BRIEF SUMMARY OF THE INVENTION

The aim of the present disclosure is to provide an offshore energy generation system to be self-reliant for producing clean energy. The aim of the present disclosure is achieved by an offshore energy generation system that employs various onboard clean energy generation systems as defined in the appended independent claims to which reference is made to. Advantageous features are set out in the appended dependent claims.

The offshore energy generation system (OEGS) is the solution for the net zero challenge for producing clean energy, in the form of electricity, and/or freshwater and/or ammonia ($NH_3$) as energy carrier for hydrogen ($H_2$). The OEGS is flexible to provide all the three products: electricity, freshwater and ammonia (NH$_3$ or any combination of one, two or three of them according to the customer requirements. The OEGS consists of a ship-shaped floating structure moored at the seabed with the systems required to deliver electricity, and/or freshwater and/or hydrogen (H$_2$), and/or nitrogen (N$_2$) and/or ammonia (NH$_3$) to be exported to shore, or other offshore or subsea systems via submerged electrical cables (or electrical power export lines) and/or pipelines, as applicable. Other offshore or subsea systems include such as offshore oil and gas production systems, e.g., spars, semisubmersible, FPSO (Floating, Production, Storage and Offloading) or similar; offshore marine terminals, ports, industrial or recreational parks, offshore and/or computer data centers, aerospace offshore facilities, offshore fish and food processing, etc.

The offshore energy generation system (OEGS) responds effectively to the climate challenge and freshwater scarcity, the need for clean liquid fuels; but it also enables a better land management and urban planning and development. The OEGS could accelerate the development of many coastlines that are currently deserted as they are isolated due to lack of freshwater; or the coastline is used for existing oil refineries, coal facilities and other facilities that could be transitioned to other use to satisfy the needs of the society.

The offshore energy generation system (OEGS) is a floating system that will operate in a similar way of an offshore oil and gas producing system, with crews manning the systems 24 hours, accommodation facilities, helipad and/or boat landing for crew transport, cranes for handling material and people to and from the supply boat, life-saving equipment, electronic connectivity to the outside world and other systems.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE-DRAWINGS

FIG. 1 illustrates a high level schematic process view, where the steam generator feeds steam to the steam turbine for electricity generation. The steam coming out the turbine is further used for seawater distillation process to generate freshwater. The remaining steam (not represented) could be used to power certain machines, as an example the freshwater export pumps, ammonia (NH$_3$) export pumps, (or compressors), seawater intake pumps and others. From a fraction of the freshwater generated on board, hydrogen (H$_2$) is generated via water electrolysis; nitrogen (N$_2$) is generated via commercially available systems. Utilizing the hydrogen (H$_2$) and the nitrogen (N$_2$), ammonia (NH$_3$) is generated, and exported to shore via pipeline in liquid or gaseous form;

Figure 4:
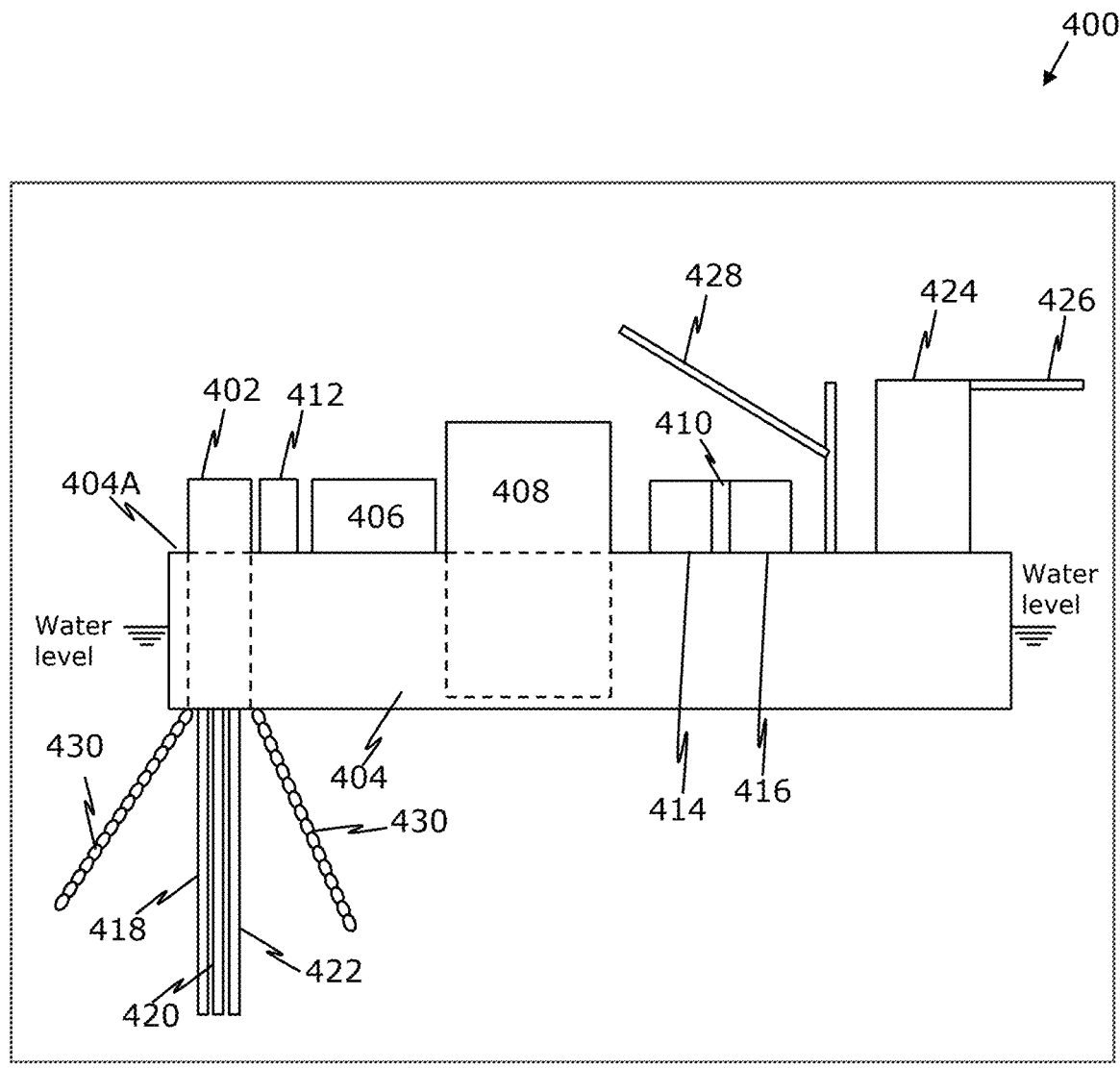
Figure 5:
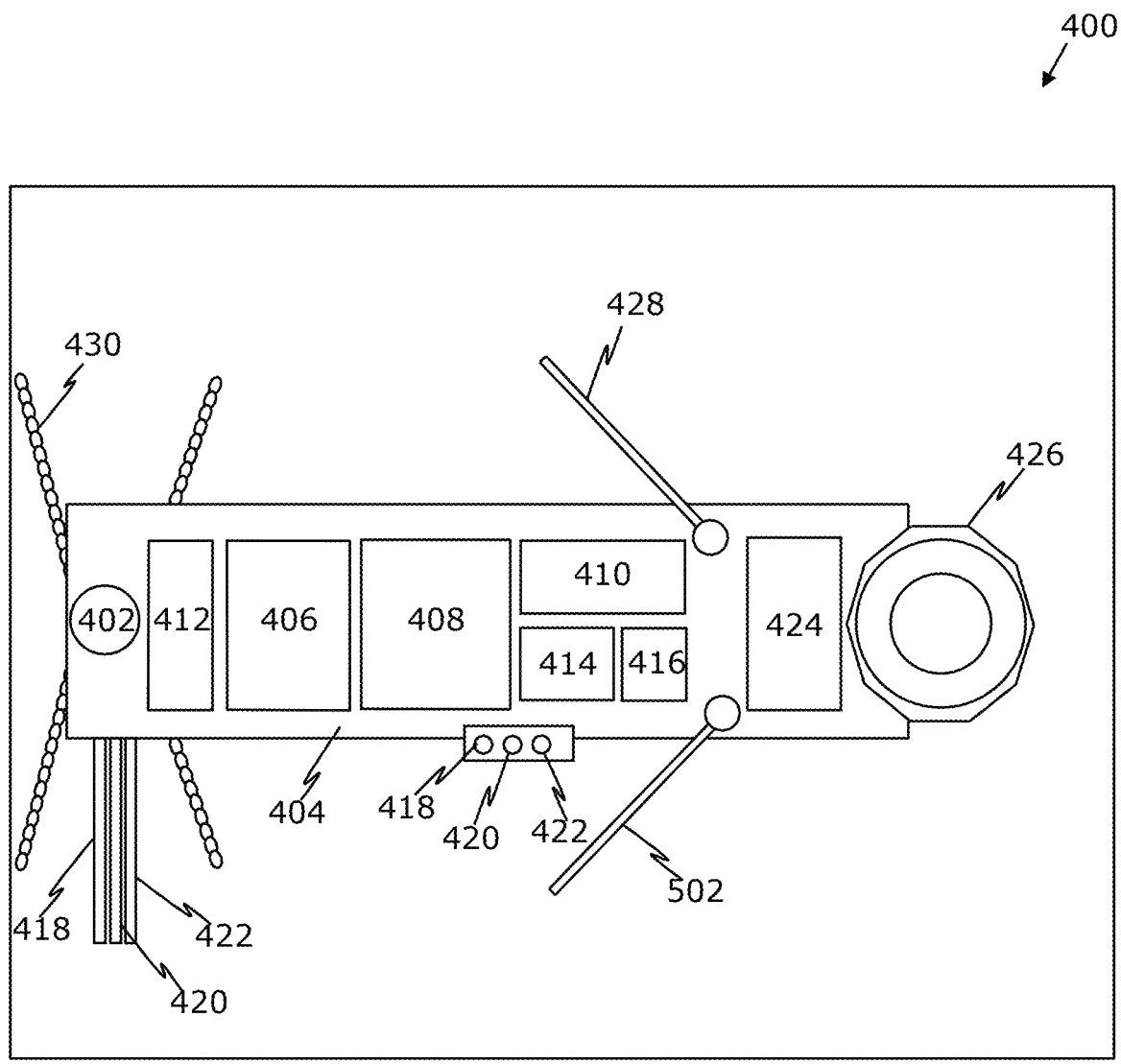

FIG. 4 illustrates a schematic profile view of the ship-shaped floating structure, outfitted with Turret. It shows the general main components layout. Differentiation between internal turret and external turret are not shown; and FIG. 5 illustrates a schematic plan view of the ship-shaped floating structure, outfitted with Turret. It shows the general main components layout. Differentiation between internal turret and external turret are not shown.

DETAILED DESCRIPTION OF THE INVENTION

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides an offshore energy generation system comprising:

a floating facility designed for mooring to a seabed portion;

a seawater collection system arranged on the floating facility and configured for collecting a volume of seawater;

a heat generating system configured for generating heat from a heat generation reaction;

a steam generation system, operatively coupled with the seawater collection system and the heat generating system, configured for generating steam from the volume of seawater collected by the seawater collection system by transferring the generated heat to the volume of seawater;

an electric power generation system, operatively coupled with the steam generation system, configured for generating electric power by using the steam generated by the steam generation system;

a freshwater generation system, operatively coupled with the seawater collection system and the steam generation system, configured for distilling freshwater by using the volume of seawater collected by the seawater collection system and steam coming out from the electric power generation system;

a hydrogen (H$_2$) generation system, operatively coupled with the freshwater generation system and the electric power generation system, configured for generating hydrogen using electrolysis of a fraction of the freshwater generated from the freshwater generation system;

a nitrogen (N$_2$) generation system, operatively coupled with the electric power generation system, configured for generating nitrogen by using atmospheric air and the electric power generated by the electric power generation system;

an ammonia generation system, operatively coupled with the electric power generation system, the hydrogen (H$_2$) generation system and the nitrogen (N$_2$) generation system, configured for generating ammonia by using the hydrogen (H$_2$), the nitrogen (N$_2$) and the electric power generated by the hydrogen generation system, the nitrogen generation system and the electric power generation system, respectively;

an electric power export system, operatively coupled to the electric power generation system, configured for exporting the generated electric power;

a freshwater export system, operatively coupled to the freshwater generation system, configured for exporting the distilled freshwater;

an ammonia export system, operatively coupled to the ammonia generation system, configured for exporting the generated ammonia;

multiple offshore cranes arranged on the floating facility;

living quarters arranged on the floating facility;

a helideck arranged on the floating facility; and an automation system for controlling the floating facility.

The process starts with high heat generation reaction; this heat is transferred to the water surrounding the reactor. The water surrounding the reactor is circulated through a heat exchanger never enters in contact with the secondary heating medium of the heat exchanger. Steam will be generated in the secondary heating medium system. This steam is conditioned and directed to a steam turbine where high voltage electrical power will be generated. The steam that leaves the steam turbine used in the process of freshwater distillation. From the freshwater distillation the remaining steam will be utilized to drive machinery and will be returned to the beginning of the process for further recirculation. Nitrogen ($N_2$) is generated onboard via commercially available nitrogen ($N_2$) generation systems. Hydrogen ($H_2$) is generated onboard utilizing a fraction of the freshwater produced via electrolysis process. Combining the hydrogen ($H_2$) and the nitrogen ($N_2$) in the ammonia ($NH_3$) generation system, we'll have a carbon-free energy source that is exported to shore via subsea pipeline that connects the ship-shaped floating structure to the receiving terminal. The ammonia ($NH_3$) could be exported in liquid or gaseous phase, depending on the capabilities of the receiving customer. The receiving shore terminal processes the ammonia ($NH_3$) further for sales and distribution. Oxygen is a by-product from the nitrogen ($N_2$) generation system and the hydrogen ($H_2$) generation system and is to be safely vented to the atmosphere.

The offshore energy generation system (OEGS) is outfitted with electrical transformers to condition the power for exportation to shore. The power exported could be alternated current (AC) or direct current (DC), depending on the power level and the distance between the offshore energy generation system (OEGS) and the substation onshore, or at the offshore consumer.

The subsea power export cable connects to the offshore energy generation system (OEGS) and is laid on the seabed until it reaches the shoreline, or other offshore systems, where it's connected to the receiving substation for further conditioning and distribution to the consumers. This receiving substation, if needed could be located onshore, or in other offshore systems, such as offshore oil and gas production systems, e.g. spars, semisubmersibles, FPSO (Floating, Production, Storage and Offloading), etc.

If freshwater is also required, the seawater from the ocean will be pumped to the freshwater maker plant for distillation. Brine will be returned to the ocean and freshwater will be conditioned and stored in the ship-shaped tanks for further processing and exportation. The storage tanks layout and design are similar to the regular tanker ships found in the market today.

If hydrogen ($H_2$) is also required a hydrogen ($H_2$) generation system electrically driven will be supplied using electrolysis and the freshwater distilled as the inputs of the hydrogen ($H_2$) generation system. If nitrogen ($N_2$) is also required a nitrogen generation system electrically driven will be supplied using commercially available systems. If ammonia ($NH_3$) is also required, an ammonia ($NH_3$) generation system will combine hydrogen ($H_2$) and nitrogen to produce ammonia in the form of $NH_3$. The generated ammonia ($NH_3$) is pumped to the shore terminal in liquid or gaseous form via pipeline connecting the ship-shaped floating structure and the shore terminal.

A subsea pipeline connects the ship-shaped floating structure and is laid on the seabed until it reaches the shoreline where it's connected to freshwater city-grid for further processing and distribution.

If required a water pump export pumps system is provided that is responsible to transfer the freshwater from the storage tanks to the pipeline that connects to the city grid. If required an ammonia ($NH_3$) export system is provided from the storage tanks to the pipeline that connects to the consumers.

The ship-shaped floating structure is kept in place by a mooring system. Depending on the water depth, oceanic and meteorologic conditions, there are two types of mooring method that could be selected:

Type 1: Spread mooring, where mooring lines are connected to the seabed by means of suction piles, regular anchors or torpedoes anchors. The ship-shaped floating structure is outfitted with mooring equipment on the four corners (forward-portside, forward-starboard side, aft-portside and aft-starboard side), where the mooring lines will be connected and properly tensioned. This system has an inherent flexibility that allows the floating structure excursion within the operational limits of the whole system.

Type 2: Turret mooring, where the bow of the ship-shaped floating structure is outfitted with a turret equipment, This turret equipment allows multiple 360 degrees free rotation around the center-point of the turret according to the prevailing weather (wind and ocean conditions). The turret could be installed internally or externally to the ship-shaped structure. The electrical power export line, the freshwater and ammonia export lines pass inside the turret and is laid on the seabed until they reach the consumers. The inner portion of the turret outfitted with mooring equipment, where the mooring lines will be connected and properly tensioned. This system has an inherent flexibility that allows the floating structure excursion within the operational limits of the whole system.

For both types of mooring system, the mooring lines are designed with a combination of chain and synthetic mooring lines, according to the design specific to the installation area.

Advanced automation and control technology is to be utilized to control all the processes onboard the ship-shaped floating structure. Additionally, encrypted remote control capabilities are installed to enable control from the central control room located in a designated location onshore, where the operator has offices.

The ship-shaped floating structure is to be outfitted with suitable accommodations for the crew living on-board in a rotation scheme. Helideck to be outfitted on the top of the accommodation in order to allow transportation of people and small parts. Cranes suitable for regular operation and special maintenance are to be outfitted on both sides of the ship-shaped floating structure. Other systems like lighting, air conditioning, compressed air, sewage, firefighting, navigational aids, entertainment, hot water, and others required by flag State, International Labor Organization and Classification Societies are to be installed to assure safety of man onboard.

For increased protection, the ship-shaped floating structure is outfitted with an emergency generator capable to sustain emergency systems in operation for a period of 21 days with intensive automation and remote control as described above. The offshore energy generation system (OEGS) is also outfitted with an uninterruptable power system (UPS) that is able to sustain emergency systems operations for few minutes while the emergency generator is automatically started and put online.

The ship-shaped floating structure is outfitted with the isolation technology called "double hull" on the critical areas (side shell and bottom), according to the state of art shipbuilding current standards.

The ship-shaped floating structure is yet designed to be built in a regular shipyard, where the integration of the heat generator system will be carried out. The heat generating equipment supplier will deliver the system in large parts for further integration with the ship-shaped floating structure. The offshore energy generation system (OEGS) is also designed to be wet-towed or dry-transported from the shipyard to the final operation location and later at the end of the design life, from the operation to the scrap yard or any other relocation required during the life of the asset.

The ship-shaped floating structure design life is between 20 and 60 years with major maintenance during the operational life.

The heat generating source technology chosen could be nuclear fusion, nuclear fission or hydrogen ($H_2$) fuel cell. All of them are viable solutions. The latter require a simpler system once electricity is produced directly from the fuel cell, excluding the requirement of steam handling and steam turbines.

The system is outfitted with multiple redundant emergency pumps and fail-open valves that ensures constant source of cooling medium (seawater) to the heat generating source in order to avoid overheating and further damages.

Figure 1:
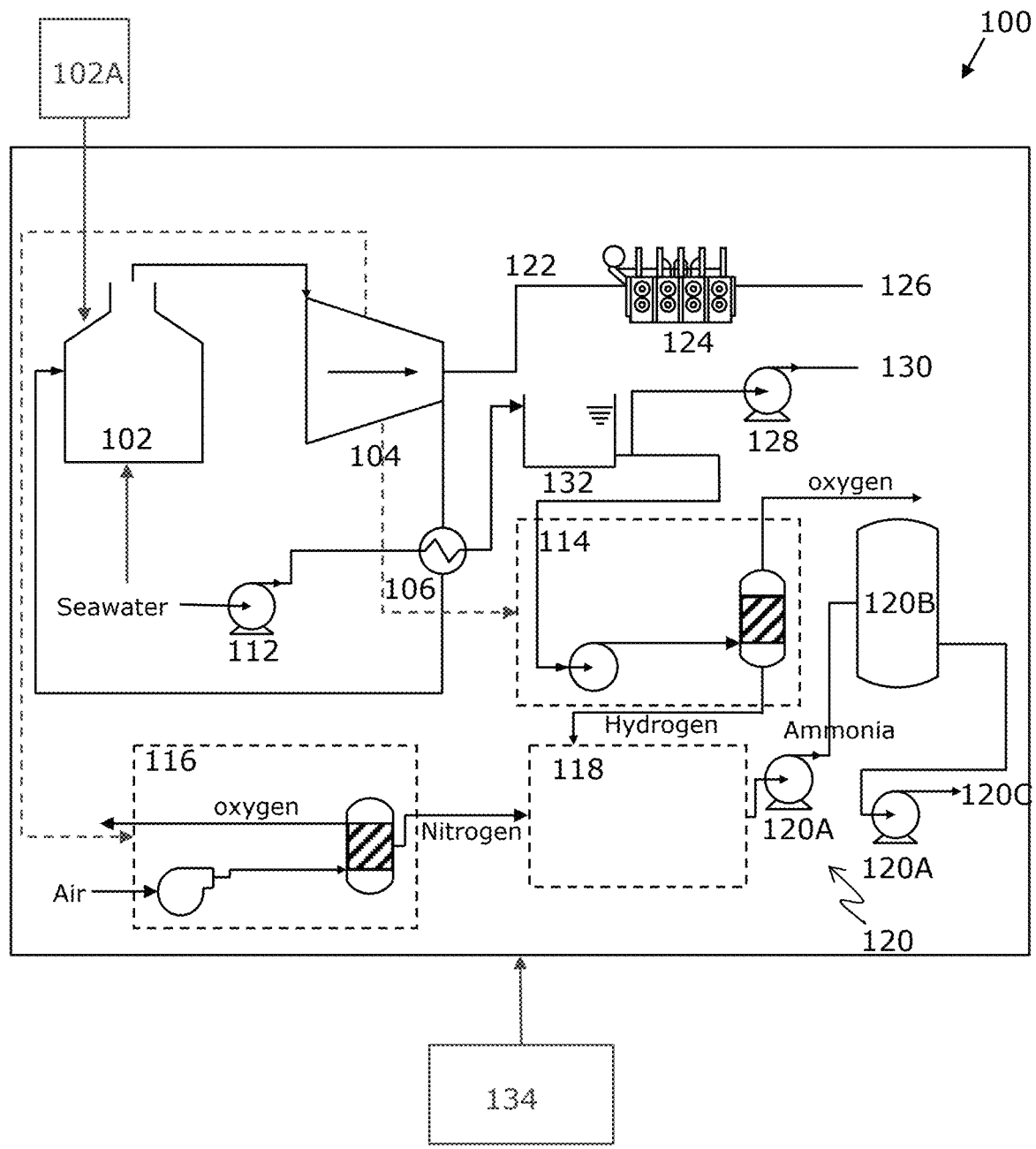

The diagram in FIG. 1 illustrates the process described above. The system is scalable from micro to giga generators and as many redundancy sub-systems as required by the client and regulatory authorities which will drive the size of the ship-shaped floating structure.

Additionally, the freshwater storage tanks serves the purpose to regulate the freshwater export flow and as an emergency secondary heat-sink system to cooldown the heat generator. The freshwater storage volume will depend on the operator's preference, could range from 0 hours of storage to multiple days.

DETAILED DESCRIPTION OF THE DRAWINGS

Referring to FIG. 1, illustrated is a high level schematic process view of an offshore energy generation system 100. As shown, the heat generating system 102A generates heat from a heat generation reaction. The steam generation system 102 feeds steam generated from the volume of sea water collected by the sea water collection system 112 to an electric power generation system 104 (comprising a steam turbine) for electric power generation. The steam coming out the electric power generation system 104 is further used for seawater distillation process to generate freshwater by the freshwater generation system 106. The remaining steam (not represented) could be used to power certain machines, as an example the freshwater export system 108, ammonia ($NH_3$) export system 110, seawater collection system 112, and others. From a fraction of the freshwater generated onboard, hydrogen ($H_2$) is generated via water electrolysis in a hydrogen ($H_2$) generation system 114; nitrogen ($N_2$) is generated via commercially available nitrogen ($N_2$) generation system 116 (by utilizing atmospheric air). The oxygen generated from the hydrogen ($H_2$) generation system 114 and the nitrogen ($N_2$) generation system 116 is vented out into the atmosphere. Utilizing the hydrogen ($H_2$) and the nitrogen ($N_2$), ammonia ($NH_3$) is generated by the ammonia ($NH_3$) generation system 118, and exported to shore, or other offshore or subsea systems 232 via ammonia ($NH_3$) export system 120 that comprises pumps or compressors 120A, an ammonia storage tank 120B, and ammonia pipeline 120C, in liquid or gaseous form. The generated electric power is exported via electric power export lines or cables 122 to a substation 124 from where the electric power is supplied to end consumers via DC/AC high voltage export lines 126. The automation system 134 is used to control all the processes onboard the floating facility 202.

The distilled freshwater is exported to shore via a freshwater export system 128 and a freshwater pipeline 130. As shown, a freshwater storage tank 132 is arranged between the freshwater generation system 106 and the freshwater export system 128, configured to store the distilled freshwater before it is exported for use by end user or for electrolysis thereof to generate hydrogen ($H_2$). As shown, both the hydrogen ($H_2$) generation system 114 and the nitrogen ($N_2$) generation system 116 comprise a set of pumps 114A and 116A and storage tanks 114B and 116B thereof, respectively, configured to store the input materials for generation of ammonia ($NH_3$) thereby.

Figure 2:
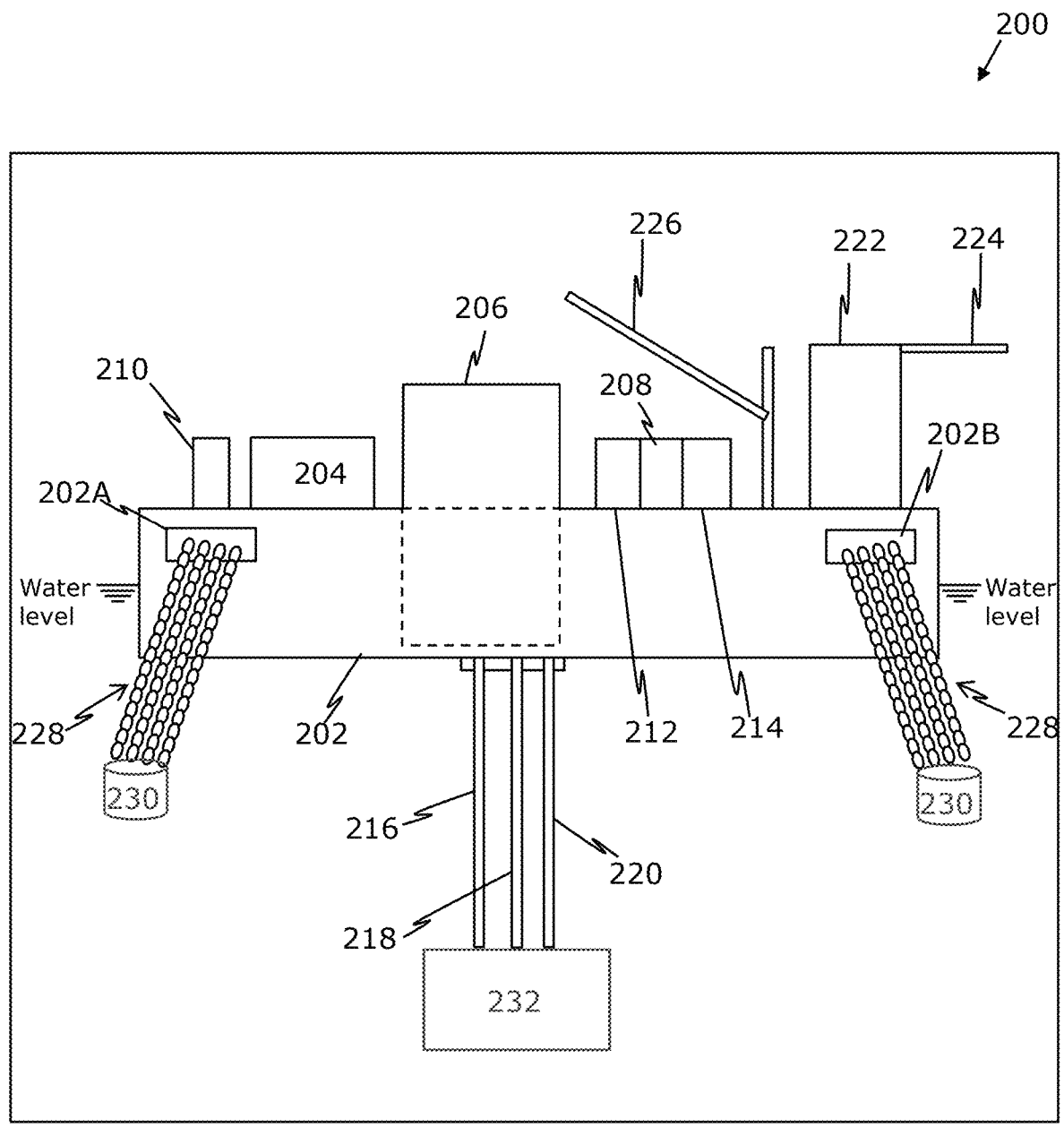
FIG. 2 illustrates a schematic profile view of the ship-shaped floating structure, outfitted with spread mooring. It shows the general main components layout.

Referring to FIG. 2, illustrated is a schematic profile view of main components of an offshore energy generation system 200 moored using spread mooring. As shown the offshore energy generation system 200 comprises a floating facility 202, a steam generation system 204, an electric power generation system 206, a freshwater generation system 208, a hydrogen generation system 210, a nitrogen generation system 212, an ammonia generation system 214, an electric power export line 216, a freshwater pipeline 218, an ammonia pipeline 220, accommodations 222, a helipad 224, an overboard crane 226, and mooring lines 228 connected to a forward-portside 202A and an aft-portside 202B on the outer perimeter (or boundary) of the floating facility 202 on one end and a seabed portion on the other end thereof. As shown, the mooring lines 228 are properly tensioned between the floating facility 202 and the seabed portion.

Figure 3:
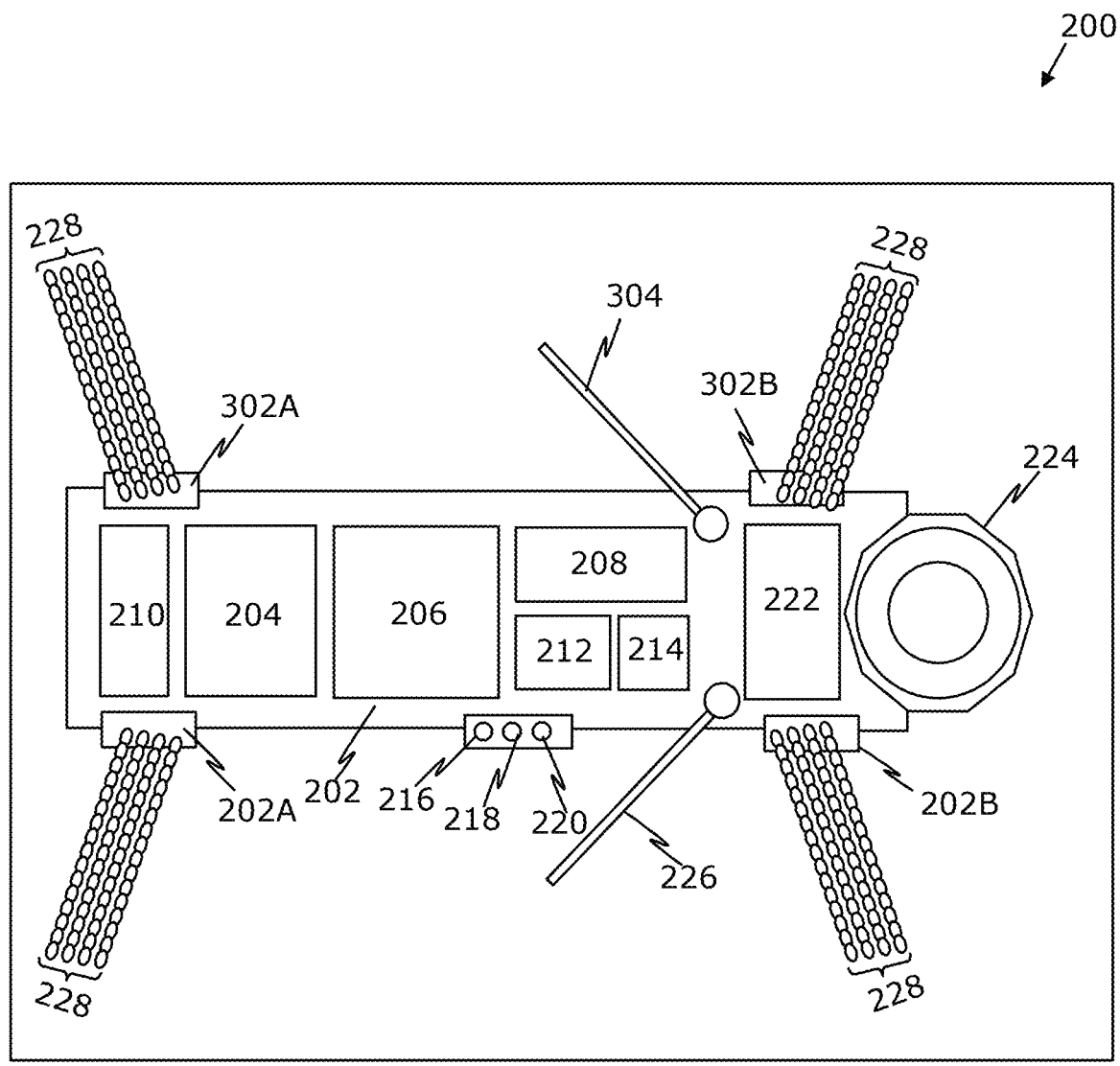
FIG. 3 illustrates a schematic plan view of the ship-shaped floating structure, outfitted with spread mooring. It shows the general main components layout.

Referring to FIG. 3, illustrated is a schematic plan view of main components of an offshore energy generation system 200, moored using spread mooring. As shown, the mooring lines 228 are further connected to a forward-starboard side 302A and an aft-starboard side 302B, besides the forward-portside 202A and the aft-portside 202B on the outer perimeter (or boundary) of the floating facility 202 on one end and the seabed portion 230 on the other end thereof. As shown, the forward-starboard side 302A and the aft-starboard side 302B are arranged on the outer perimeter (or boundary) of the floating facility 202 opposite to the forward-portside 202A and the aft-portside 202B respectively. As shown, the mooring lines 228 are properly tensioned between the floating facility 202 and the seabed portion 230. Also, there is shown presence of an onboard crane 304 in addition to the overboard crane 226.

Referring to FIG. 4, illustrated is a schematic profile view of main components of an offshore energy generation system 400, moored using a turret equipment 402. As shown the offshore energy generation system 400 comprises a floating facility 404, a steam generation system 406, an electric power generation system 408, a freshwater generation system 410, a hydrogen generation system 412, a nitrogen generation system 414, an ammonia generation system 416, an electric power export line 418, a freshwater pipeline 420, an ammonia pipeline 422, accommodations 424, a helipad 426, an overboard crane 428, and the turret equipment 402. As shown, the turret equipment 402 is arranged on a bow region 404A of the floating facility the floating facility 404. As shown, the electric power export line 418, the freshwater pipeline 420, and the ammonia pipeline 422 pass through the turret equipment 402 and are laid on the seabed. As shown, the turret equipment 402 is arranged with mooring lines 430, wherein the mooring lines 430 extend outward from the turret equipment 402 to a seabed portion.

Referring to FIG. 5, illustrated is a schematic plan view of main components of an offshore energy generation system 100, moored using a turret equipment 402. As shown, the mooring lines 436 connected the turret equipment 402 and the seabed portion 438 from 4 sides of the turret equipment 402. Herein, the 4 sides are arranged corresponding to a forward-portside 404A, a aft-portside 404B a forward-starboard side 404C, and an aft-starboard side 404D of the floating facility 404. As shown, the mooring lines 436 are properly tensioned between the turret equipment 402 and the seabed portion 438. As shown, the electric power export line 418, the freshwater pipeline 420, and the ammonia pipeline 422 are also provided straight from floating facility 404 and are laid on the seabed. Also, there is shown presence of an onboard crane 502 in addition to the overboard crane 428.

What is claimed is:

1. An offshore energy generation system comprising:
    an offshore floating facility designed for mooring to a seabed portion;
    an offshore seawater collection system arranged on the floating facility and configured for collecting a volume of seawater;
    an offshore heat generating system configured for generating heat from a heat generation reaction, wherein the heat is transferred to water surrounding the offshore heat generating system, and wherein the water being circulated through a heat exchanger is without direct contact with a secondary heating medium in the heat exchanger;
    an offshore steam generation system, operatively coupled with the offshore seawater collection system and the offshore heat generating system, configured for generating steam in the secondary heating medium by transferring the heat from the water circulated through the heat exchanger;
    an offshore electric power generation system, operatively coupled with the offshore steam generation system, configured for generating electric power by using the steam generated by the offshore steam generation system;
    an offshore freshwater generation system, operatively coupled with the seawater collection system and the offshore steam generation system, configured for distilling seawater by using the volume of seawater collected by the offshore seawater collection system and a portion of steam coming out from the offshore electric power generation system, wherein a remaining portion of the steam coming out from the offshore electric power generation system is utilized to drive one or more of machineries of the offshore energy generation system including at least one of: an offshore freshwater export system, an offshore ammonia export system, and the offshore seawater collection system;
    an offshore hydrogen ($H_2$) generation system, operatively coupled with the offshore freshwater generation system and the offshore electric power generation system, configured for generating hydrogen using electrolysis of a fraction of the freshwater generated from the offshore freshwater generation system;
    an offshore nitrogen ($N_2$) generation system, operatively coupled with the offshore electric power generation system, configured for generating nitrogen by using atmospheric air and the electric power generated by the offshore electric power generation system;
    an offshore ammonia generation system, operatively coupled with the offshore electric power generation system, the offshore hydrogen ($H_2$) generation system and the offshore nitrogen ($N_2$) generation system, configured for generating ammonia by using the hydrogen ($H_2$), the nitrogen ($N_2$) and the electric power generated by the offshore hydrogen generation system, the offshore nitrogen generation system and the offshore electric power generation system, respectively;
    an offshore electric power export system, operatively coupled to the offshore electric power generation system, configured for exporting the generated electric power;
    the offshore freshwater export system, operatively coupled to the offshore freshwater generation system, configured for exporting the freshwater;
    the offshore ammonia export system, operatively coupled to the offshore ammonia generation system and an offshore ammonia storage tank, configured for exporting the generated ammonia;
    an offshore freshwater storage tank operatively coupled to the offshore freshwater export system, wherein the offshore freshwater storage tank is configured to:
        regulate freshwater export flow, and
        serve as an emergency secondary heat-sink system to cool down the offshore heat generating system, wherein a freshwater storage volume is adjusted based on operator preference and depending on specific operational requirements;
    multiple offshore cranes arranged on the floating facility;
    living quarters arranged on the floating facility;
    a helideck arranged on the floating facility; and
    an automation system for controlling the floating facility.

2. The offshore energy generation system according to claim 1, wherein the mooring includes a spread mooring having mooring lines, and wherein the mooring lines are configured to connect the offshore floating facility to the seabed portion.

3. The offshore energy generation system according to claim 2, wherein the spread mooring comprises arranging the mooring lines on at least a part of a perimeter of the offshore floating facility, and wherein the part of the perimeter of the offshore floating facility is selected from: a forward-portside, a forward-starboard side, an aft-portside, and an aft-starboard side thereof.

4. The offshore energy generation system according to claim 1, wherein the offshore freshwater export system is configured to export the freshwater to at least one of: a shore system, or an offshore system, or a subsea system, via pipelines.

5. The offshore energy generation system according to claim 4, wherein the offshore ammonia export system is configured to export the generated ammonia to at least one of: a shore system, or an offshore system, or a subsea system, via pipelines.

6. The offshore energy generation system according to claim 1, wherein the offshore heat generating system is further configured for generating heat by using nuclear fission.

* * * * *